United States Patent
Ball et al.

(10) Patent No.: US 6,333,624 B1
(45) Date of Patent: Dec. 25, 2001

(54) CIRCUIT AND METHOD FOR A SWITCHING POWER SUPPLY WITH PRIMARY SIDE TRANSFORMER SENSING

(75) Inventors: Alan Ball, Gilbert; Kristie Valdez, Phoenix, both of AZ (US)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/579,124

(22) Filed: May 30, 2000

(51) Int. Cl.$^7$ ........................................................ G05F 1/40
(52) U.S. Cl. ........................ 323/284; 323/285; 323/313; 363/21.01; 363/97
(58) Field of Search ................... 363/20, 21.41, 363/97, 131, 21.01, 21.07, 21.08, 21.15, 21.16; 323/262, 284, 285, 299, 301, 303, 313

(56) References Cited

U.S. PATENT DOCUMENTS

| | | | |
|---|---|---|---|
| 5,305,192 | * 4/1994 | Bonte et al. | ............................ 363/21 |
| 5,349,284 | * 9/1994 | Whittle | ................................. 323/207 |
| 5,619,405 | * 4/1997 | Kammiller et al. | ................... 363/80 |

* cited by examiner

Primary Examiner—Peter S. Wong
Assistant Examiner—Gary L. Laxton

(57) ABSTRACT

A switching power supply (30) receives an AC voltage at a primary side of a transformer (36) and converts it to a regulated DC output voltage at the secondary side of the transformer (36). The switching power supply (30) includes a voltage regulation compensation circuit (52) to monitor the transformers primary side providing a reference signal $V_{REF}$ related to the transformers secondary side. Signal $V_{COMP}$ is a current reference signal representative of the primary side inductor current flowing through the emitter of a power transistor (38). $V_{COMP}$ is fed into a sample and hold circuit (70) and amplified to a DC level proportional to the peak level of the inductor current of the power transistor (38). The output of the sample and hold circuit (70) is fed to two inputs of a multiplier circuit (82) where the output thereof is a square of the two inputs fed to a k-factor circuit (83).

30 Claims, 3 Drawing Sheets

CIRCUIT AND METHOD FOR A SWITCHING POWER SUPPLY WITH PRIMARY SIDE TRANSFORMER SENSING

BACKGROUND OF THE INVENTION

The present invention relates in general to electronic circuits and, more particularly, to switching power supplies which convert an AC signal to a regulated DC signal.

A DC voltage is typically derived from an AC power source, e.g. by plugging a power supply into a wall socket. The AC voltage available at the wall socket is converted to a DC bulk voltage by a full-wave rectifier diode bridge. The DC bulk voltage is further converted to a regulated DC output voltage by a switching power supply.

The switching power supply uses a transformer, or an inductor depending on the configuration, as an energy transfer element. For example, a flyback-type power supply has a power switching transistor coupled to one side of the primary winding of a transformer. The power transistor turns on and off as determined by a regulator circuit to alternately store energy in the magnetic field of the transformer and transfer the stored energy to the secondary winding. The secondary winding of the transformer develops an output voltage across a shunt capacitor coupled across the secondary winding as a function of the energy transfer. The voltage across the capacitor provides the DC output voltage of the switching power supply.

The DC output voltage increases and decreases with the applied load. An increasing load decreases the DC output voltage and a decreasing load increases the DC output voltage. In most prior art applications, the DC output voltage, or a representation thereof from the secondary side of the transformer, is fed back to the regulator circuit so the switching power supply can compensate for load variation. As the load increases, the DC output voltage decreases causing the regulator to leave the power transistor on for a longer period of time to store more energy in the magnetic field. The additional energy is transferred to the secondary winding during the off time of the power transistor to supply the increased load and re-establish the DC output voltage. As the load decreases, the DC output voltage increases which causes the regulator to leave the power transistor on for a shorter period of time to store less energy in the magnetic field. The reduced energy transfer to the secondary winding during the off time of the power transistor causes the power supply to adjust to the decreased load and reduce the DC output voltage back to its steady-state value.

FIG. 1 illustrates prior art switching power supply 10 that receives an AC line voltage and converts it to a regulated DC operating voltage. Specifically, an AC line voltage is converted to a DC bulk voltage by the full-wave rectifier diode bridge 12. Capacitor 14 filters the DC bulk voltage, and the primary winding of transformer 16 receives the DC bulk voltage. Regulator 18 modulates an inductor current through the primary winding of transformer 16 to control the amount of energy stored in the magnetic field of transformer 16. The energy stored in the magnetic field is transferred to the secondary winding where capacitor 20 is coupled across the secondary winding to develop a DC output voltage ($V_{OUT}$). Diode 22 and photo-detection transistor 24 act together to optically couple feedback information from reference and error amplifier 23 to regulator circuit 18 to regulate $V_{OUT}$ of switching power supply 30.

Most switching power supplys have a feedback mechanism on the secondary side of the transformer. The feedback mechanism provides a feedback signal to a regulator circuit to regulate the output voltage of the switching power supply. The feedback mechanism is typically comprised of optical devices, and a reference and error amplifier installed to the secondary side of the transformer. A need exist for a switching power supply which uses only primary side information to regulate the output thereby reducing secondary side feedback devices. The invention disclosed herein will address the above problems.

DETAILED DESCRIPTION OF THE PREFERRED EMBODIMENT

Figure 1:
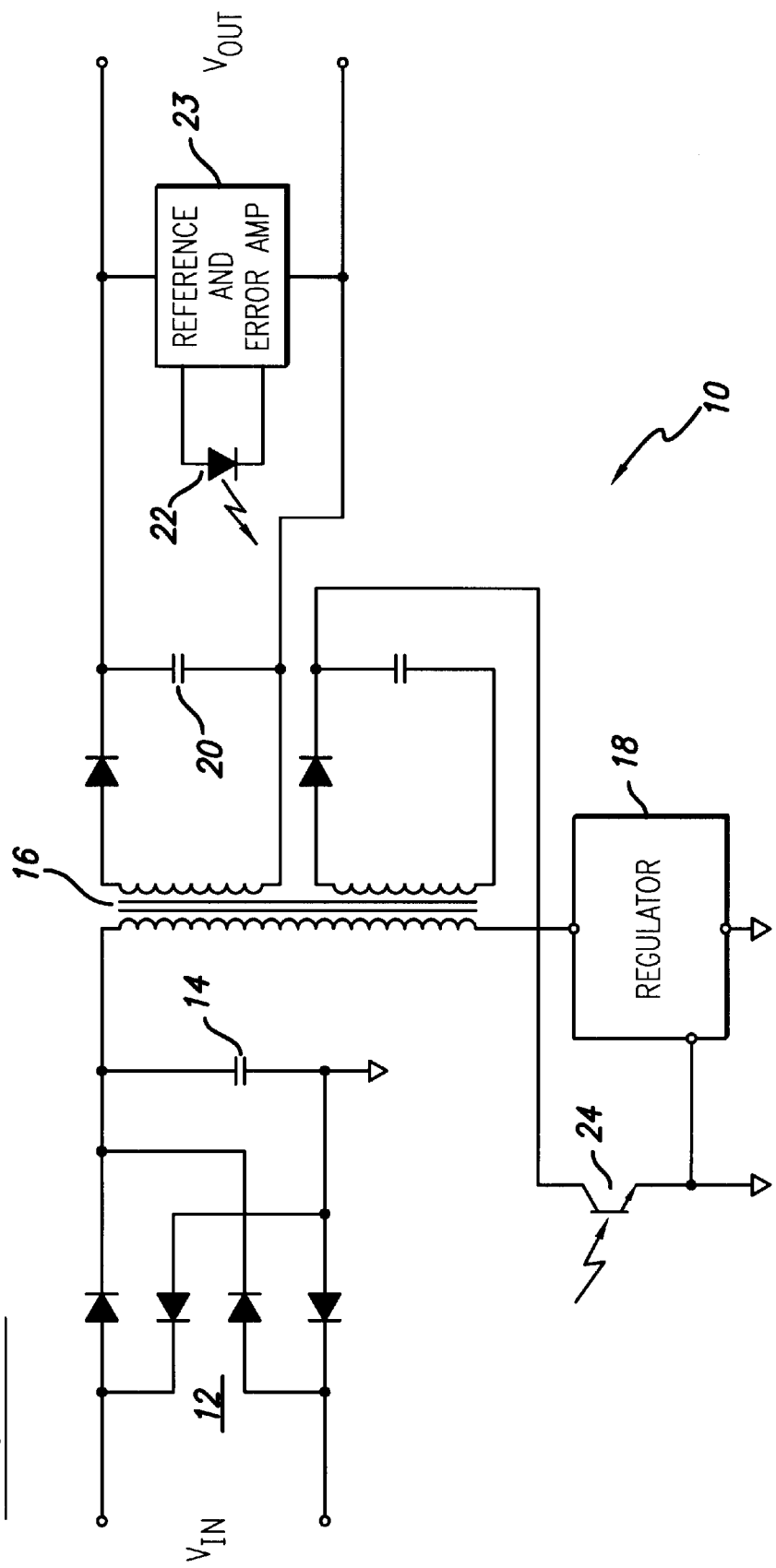
FIG. 1 is a schematic diagram of a prior art switching power supply.
Figure 2:
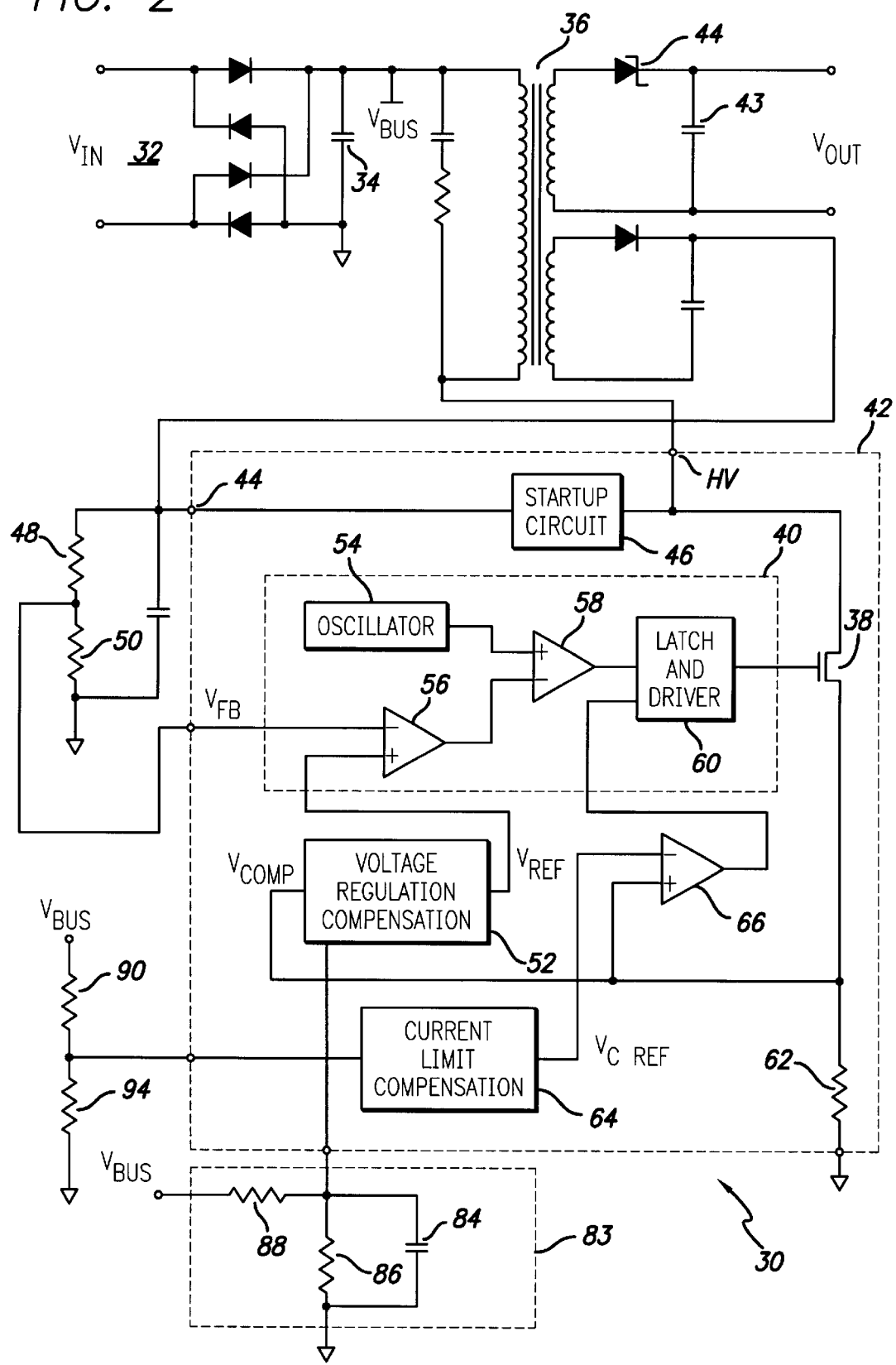
FIG. 2 is a schematic diagram of a switching power supply including a voltage regulation compensation circuit.

FIG. 2 illustrates an embodiment of switching power supply 30. Specifically, switching power supply 30 receives an AC line voltage and converts it to a regulated DC operating voltage. The AC line voltage is converted to a DC bulk voltage by full-wave rectifier diode bridge 32. Capacitor 34 filters the DC bulk voltage, and the primary winding of transformer 36 receives the DC bulk voltage. Power transistor 38 conducts an inductor current through the primary winding of transformer 36, and operates on regulation cycles activated by switching regulator circuit 40 to control the amount of energy stored in the magnetic field of transformer 36. When power transistor 38 is non-conductive, the energy stored in the magnetic field is transferred to the secondary winding where capacitor 43 is coupled across the secondary winding to develop DC output voltage $V_{OUT}$. Diode 44 prevents current flow back into the secondary winding.

Regulator circuit 42 monitors and retrieves primary side information from transformer 36 and uses the information from the primary side to approximate the secondary side output current. The approximation provides a constant regulated voltage output to switching power supply 30. Regulator circuit 42 is comprised of the following. Start-up circuit 46 is coupled to power supply terminal 44 to start-up the circuit during start or restart conditions. Start-up circuit 46 can be implemented as in U.S. Pat. No. 5,477,175 which is incorporated herein by reference. High voltage terminal (HV) is connected to the drain of power transistor 38 for coupling to high voltage on the primary winding of transformer 36. Switching regulator circuit 40 is coupled to receive feedback signal $V_{FB}$ and reference signal $V_{REF}$ to provide a drive signal to the gate of power transistor 38. Feedback signal $V_{FB}$ can be a fixed signal or a variable signal created by varying resistor 48 and resistor 50. Reference signal $V_{REF}$ can be a fixed reference signal or a variable reference signal created by voltage regulation compensation circuit 52.

Switching regulator circuit 40 contains the following components. Oscillator 54 generates a fixed frequency sawtooth ramp signal. Error amplifier 56 has one input to receive feedback signal $V_{FB}$, and a second input to receive reference signal $V_{REF}$ from voltage regulation compensation circuit 52. Comparator 58 compares the fixed frequency sawtooth ramp signal from oscillator 54 to the output from error amplifier 56. The intersection of the output from error amplifier 56 and the fixed frequency sawtooth ramp signal from oscillator 54 determines a duty cycle to control the switching of power transistor 38. Latch and driver circuit 60 couples to receive the output from comparator 58, and provides the drive signal to power transistor 38.

Voltage regulation compensation circuit 52 receives signal $V_{COMP}$, and determines a reference signal $V_{REF}$ based on the input signal $V_{COMP}$. $V_{COMP}$ is a current reference signal representative of the inductor current flowing through power transistor 38. The output voltage of switching power supply 30 is regulated by switching power transistor 38 on and off based on the duty cycle determined from reference signal $V_{REF}$. Voltage regulation compensation circuit 52 performs the following calculation to determine $V_{REF}$ by sensing the inductor current at the source of power transistor 38.

$$I_o = \left(\frac{1}{2}\frac{fL}{V_o}\right)I^2 = kI^2$$

The relation relates the secondary output current (Io) to the peak primary side inductor current (I) flowing through power transistor 38, where L is the primary side transformer inductance, f is the switching frequency, Vo is the output voltage of switching power supply 30, k is a k-factor representative of switching power supply 30, $V_D$ is a diode voltage, and C is a scaling voltage.

Current limit compensation circuit 64 adjusts the current limit reference to current limit comparator 66 based on primary side information of transformer 36. Current limit comparator 66 receives a voltage representation of an inductor current at the source of power transistor 38, and a reference signal $V_{CREF}$ from the output of current limit compensation circuit 64. Current limit comparator 66 provides a current limit level for switching power supply 30. Current limit compensation circuit 64 adjusts the current limit reference based on the DC rectified input voltage $V_{BUS}$.

Figure 3:
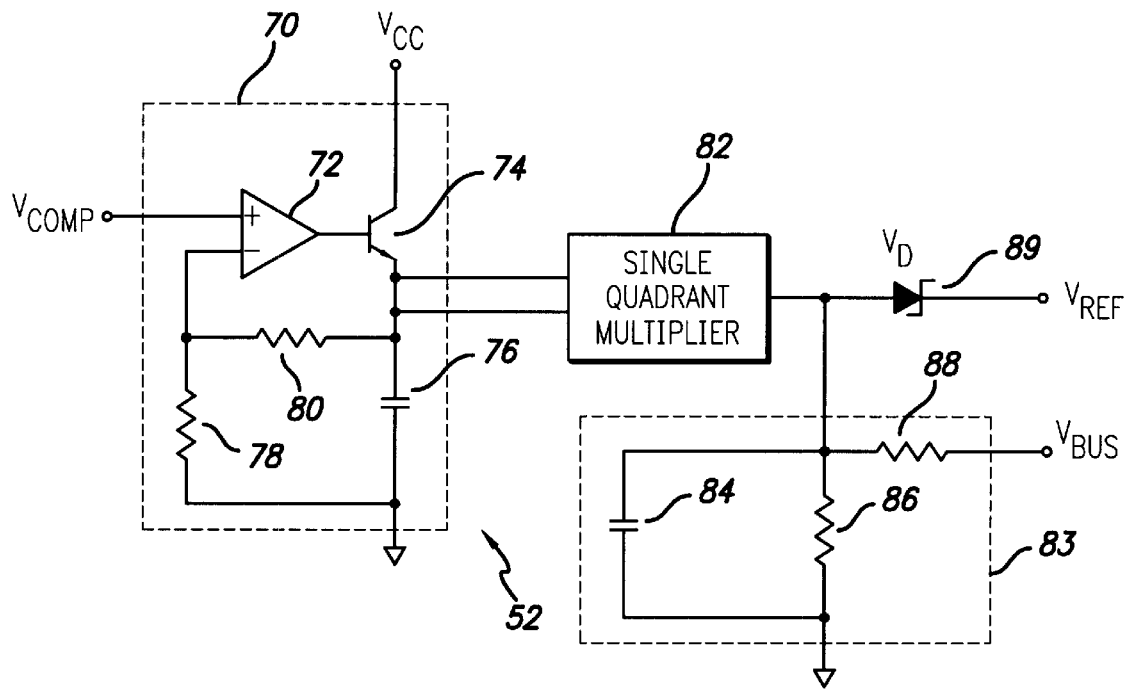
FIG. 3 is a schematic diagram of the voltage regulation compensation circuit included in FIG. 2.

FIG. 3 illustrates voltage regulation compensation circuit 52. $V_{COMP}$ is received at the input of voltage regulation compensation circuit 52 as a current reference signal representative of the inductor current flowing through power transistor 38. $V_{COMP}$ is fed into sample and hold circuit 70 where $V_{COMP}$ is amplified and a DC level signal is established that is proportional to the peak level of the inductor current flowing through the emitter of power transistor 38 (FIG. 2). Sample and hold circuit 70 comprises the following components. Amplifier 72 has $V_{COMP}$ fed to its positive terminal, and the output fed into the base of transistor 74. The collector of transistor 74 receives a power supply and its emitter is connected to a terminal of capacitor 76. A terminal of resistor 78 is connected to the negative terminal of amplifier 72 and resistor 80 is connected between capacitor 76 and resistor 78. The components of capacitor 76, resistor 78, and resistor 80 comprise a feedback loop to couple from the emitter of transistor 74 back to the negative terminal of amplifier 72.

The emitter of transistor 74 supplies a current to the two inputs of multiplier circuit 82. The output of multiplier circuit 82 is a square of its two inputs. The current from the emitter of transistor 74 is a representation of the peak primary side inductor current flowing through power transistor 38 (FIG. 2). The output of multiplier circuit 82 is connected to k-factor circuit 83. Capacitor 84 is connected between the output of multiplier circuit 82 and ground potential, resistor 86 is connected in parallel to capacitor 84, and resistor 88 is connected between the output of multiplier circuit 82 and $V_{BUS}$ from the primary side of transformer 36. Resistor 86 is used to set the k-factor, capacitor 84 filters noise out of the signal at the output of voltage regulation compensation circuit 52, and resistor 88 compensates for variations in output voltage due to changes in the AC input voltage at switching power supply 30. The k-factor components are a function of frequency, inductance, output voltage and output impedance, and are typically external components set by the user to be representative of the power supply. Diode 89 has a voltage $V_D$ to increase $V_{REF}$ to reduce the resistive losses at the output. A typical value for $V_D$ is 2.5 volts. $V_{REF}$ can be a variable reference signal at the output of voltage regulation compensation circuit 52. The variable reference signal is a function of the inductor current flowing through power transistor 38, and provides output information to provide voltage regulation of $V_{OUT}$.

Figure 4:
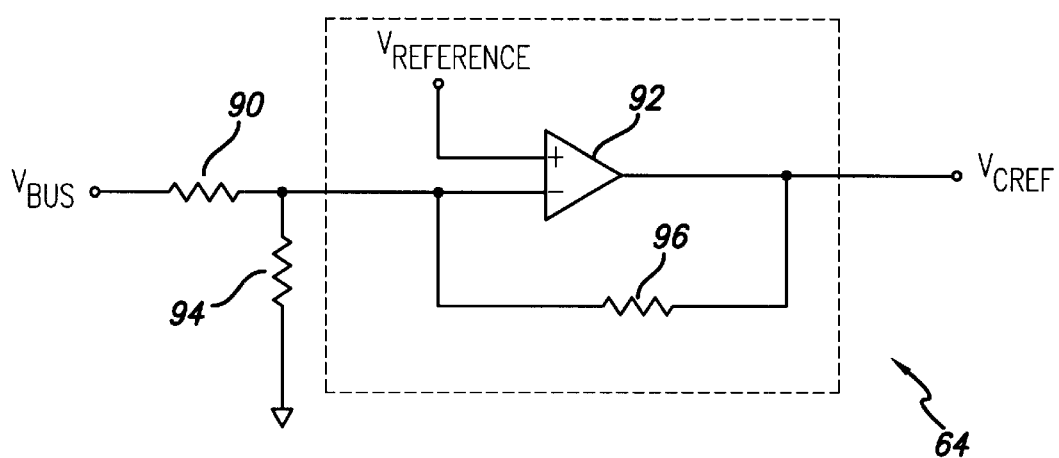
FIG. 4 is a schematic diagram of a current limit compensation circuit included in FIG. 2.

Typical current limit systems for switching power supplies have a propagation delay associated with turning off the power supply upon current limit. To reduce the effects of the propagation delay associated with current limit circuitry, current limit compensation circuit 64 is used in regulator circuit 42 as illustrated in FIG. 2. FIG. 4 illustrates current limit compensation circuit 64. As the input voltage to switching power supply 30 increases, the voltage $V_{BUS}$ also increases. $V_{BUS}$ is a primary side voltage fed to the input of current limit compensation circuit 64 through the voltage divider network of resistor 90 and resistor 94. The output $V_{CREF}$ of current limit compensation circuit 64 decreases as $V_{BUS}$ increases. The reference signal $V_{CREF}$ is fed to current limit comparator 66 where the decreased $V_{CREF}$ signal provides a reduction in the current limit to compensate for the propagation delay. $V_{BUS}$ is coupled to the negative terminal of amplifier 92, and a voltage reference $V_{REFERENCE}$ is connected to the positive terminal of amplifier 92. Resistor 96 is connected between the negative input terminal and the output terminal of amplifier 92.

The typical operation and regulation of switching power supply 30 is explained by way of an example. If the load on the output of switching power supply 30 is changed so the output current increases, the increase in output current decreases the secondary side output voltage $V_{OUT}$ at transformer 36. The decrease in $V_{OUT}$ is sensed as a need to transfer more power from the primary side to the secondary side of transformer 36. The demand for power at the secondary side increases the primary side inductor current flowing through transformer 36, thereby increasing the primary side current flowing through power transistor 38 (FIG. 2). The increase in primary side inductor current flowing through power transistor 38 (FIG. 2) increases the voltage signal $V_{COMP}$ at the input to voltage regulation compensation circuit 52. $V_{COMP}$ is fed to sample and hold circuit 70 of voltage regulation compensation circuit 52 as illustrated in FIG. 3. Sample and hold circuit 70 amplifies $V_{COMP}$ to establish a DC level that is proportional to the peak primary side inductor current flowing through power transistor 38 (FIG. 2). The output of sample and hold circuit 70 is fed to multiplier circuit 82, whereby a square of the current flowing through transistor 74 is established. The output of multiplier circuit 82 is multiplied by the k-factor component to establish the voltage reference signal $V_{REF}$ at the output to voltage regulation compensation circuit 52.

Specifically, the output of voltage regulation compensation circuit 52 provides the square of the primary side inductor current multiplied by a constant term, the k-factor, to determine to an approximation the change in secondary side output current of power supply 30. The change in secondary side output current is compensated by an increase in $V_{REF}$ at the output to voltage regulation compensation circuit 52. The increase in $V_{REF}$ increases the duty cycle of switching regulator circuit 40 to transfer more power from the primary to the secondary side of transformer 36 to increase $V_{OUT}$ which provides the necessary regulation at the output to power supply 30. The approximation provides less than 5% output voltage regulation.

The present invention illustrated switching power supply 30 used in a power supply application with primary side sensing. In response to $V_{OUT}$ variations, the primary side inductor current flowing through power transistor 38 changes. The change in primary side inductor current is fed to the input of voltage regulation compensation circuit 52 to provide a reference signal $V_{REF}$ which is related to the change in secondary side inductor current through the previous mathematical relation. The increase in $V_{REF}$ is fed to switching regulator circuit 40 to provide a gate drive signal to power transistor 38. Power transistor 38 conducts an inductor current through the primary winding of transformer 36 in response to the gate drive signal to reduce the $V_{OUT}$ variations of switching power supply 30 to provide less than 5% output voltage regulation. Current limit compensation circuit 64 reduces the propagation delay associated with turn off of a switching power supply at current limit.

In summary, a switching power supply using a voltage regulation compensation circuit is disclosed. The voltage regulation compensation circuit receives information from the primary side of a transformer to compensate for load variation and provide a regulated power supply output. Since only the primary side of the transformer supplies information to compensate for load variation, the secondary side optical devices typically used on prior art switching power supplies can be eliminated. Thus, the disclosed embodiment decreases regulator circuit complexity, and provides a more cost effective solution by eliminating the need to use secondary side sensing to provide regulation.

What is claimed is:

1. In a regulator circuit, a voltage compensation circuit for providing a variable reference signal, comprising:
    a sample and hold circuit coupled to receive a compensation signal and provide an output signal having a direct current (DC) level proportional to a peak value of the compensation signal; and
    a multiplier circuit having first and second inputs coupled to receive the output signal from the sample and hold circuit and an output for providing the variable reference signal.

2. The sample and hold circuit of claim 1, further includes an amplifier having a first input coupled for receiving the compensation signal and a second input coupled for receiving a feedback signal.

3. The sample and hold circuit of claim 2, further includes:
    feedback circuitry with an input coupled to receive the output signal and an output coupled to the second input of the amplifier to provide the feedback signal; and
    a transistor having a control terminal coupled to an output of the amplifier, a first conduction terminal coupled to a first power supply terminal, and a second conduction terminal coupled to the input of the feedback circuitry.

4. The sample and hold circuit of claim 3, wherein the feedback circuitry includes:
    a capacitor with a first terminal coupled to the second terminal of the transistor and a second terminal coupled to a second power supply terminal;
    a first resistor with a first terminal coupled to the first terminal of the capacitor and a second terminal coupled to the second input of the amplifier; and
    a second resistor with a first terminal coupled to the second terminal of the first resistor and a second terminal coupled to the second power supply terminal.

5. The regulator circuit of claim 1 wherein the multiplier circuit is further coupled for receiving a k-factor signal representative of a power supply.

6. A regulation circuit for use in a power supply, wherein the power supply converts an input voltage to an output voltage by switching an inductor current according to a switching transistor drive signal, the regulation circuit comprising:
    a switching regulator coupled for receiving a first feedback signal and a variable reference signal to provide the switching transistor drive signal; and
    a compensation circuit coupled for receiving a current reference signal representative of the inductor current for generating the variable reference signal.

7. The regulation circuit of claim 6 wherein the compensation circuit provides the variable reference signal proportional to a square of the current reference signal.

8. The regulation circuit of claim 7 wherein the compensation circuit is further coupled for receiving a k-factor signal representative of the power supply.

9. The compensation circuit of claim 6 further includes:
    a sample and hold circuit coupled to receive the current reference signal and provide an output signal having a direct current (DC) level proportional to a peak value of the current reference signal; and a multiplier circuit having first and second inputs coupled to receive the output signal from the sample and hold circuit and an output for providing the variable reference signal.

10. The sample and hold circuit of claim 9, further includes:
    an amplifier having a first input coupled for receiving the current reference signal and a second input coupled for receiving a second feedback signal;
    feedback circuitry with an input coupled to an output of the amplifier and an output coupled to the second input of the amplifier to provide the second feedback signal; and
    a transistor having a control terminal coupled to an output of the amplifier, a first conduction terminal coupled to a first power supply terminal, and a second conduction terminal coupled to the input of the feedback circuitry.

11. The switching regulator of claim 6, further includes:
    an oscillator;
    an amplifier having a first terminal coupled to receive the first feedback signal, a second terminal coupled to the variable reference signal;
    a comparator having a first terminal coupled to receive the oscillator signal, a second terminal coupled to receive an output from the amplifier; and
    a latch and driver circuit having an input coupled to an output of the comparator, and an output providing the switching transistor drive signal.

12. The switching regulator circuit of claim 11, further including a transistor having a first conduction terminal coupled to the input voltage, a second conduction terminal providing the inductor current, and a control terminal coupled for receiving the switching transistor drive signal.

13. The regulation circuit of claim 11, further including a current limit circuit having a first input coupled to receive the inductor current, a second input coupled to receive a reference output signal, and an output coupled to the latch and drive circuit.

14. The regulation circuit of claim 13, further including a current limit compensation circuit having an input coupled for receiving the input voltage and an output coupled to provide the reference output signal.

15. A regulation circuit for use in a power supply, wherein the power supply converts an input voltage to an output voltage by switching an inductor current according to a switching transistor drive signal, the regulation circuit comprising:

a switching regulator coupled for receiving a feedback signal to provide the switching transistor drive signal; and a compensation circuit coupled for receiving a compensation signal representative of the inductor current for generating a variable reference signal to adjust the feedback signal to the switching regulator.

16. The regulation circuit of claim 15 wherein the compensation circuit provides the variable reference signal proportional to a square of the compensation signal.

17. The regulation circuit of claim 16 wherein the compensation circuit is further coupled for receiving a k-factor signal representative of the power supply.

18. The compensation circuit of claim 15 further includes:

a sample and hold circuit coupled to receive the compensation signal and provide an output signal having a direct current (DC) level proportional to a peak value of the compensation signal; and a multiplier circuit having first and second inputs coupled to receive the output signal from the sample and hold circuit and an output for providing the variable reference signal.

19. The sample and hold circuit of claim 18, further includes:

an amplifier having a first input coupled for receiving the compensation signal and a second input coupled for receiving a coupling signal;

coupling circuitry having an output coupled to the second input of the amplifier to provide the coupling signal; and a transistor having a control terminal coupled to an output of the amplifier, a first conduction terminal coupled to a first power supply terminal, and a second conduction terminal coupled to an input of the coupling circuitry.

20. The switching regulator of claim 15, further includes:

an oscillator;

an amplifier having a first terminal coupled to receive the feedback signal, a second terminal coupled to the variable reference signal;

a comparator having a first terminal coupled to receive the oscillator signal, a second terminal coupled to receive an output from the amplifier; and a latch and driver circuit having an input coupled to an output of the comparator, and an output providing the switching transistor drive signal.

21. The switching regulator of claim 20, further including a transistor having a first conduction terminal coupled to the input voltage, a second conduction terminal providing the inductor current, and a control terminal coupled for receiving the switching transistor drive signal.

22. The regulation circuit of claim 20, further including a current limit comparator having a first input coupled to receive the inductor current, a second input coupled to receive a reference output signal, and an output coupled to the latch and driver circuit.

23. The regulation circuit of claim 22, further including a current limit compensation circuit having an input coupled for receiving the input voltage and an output coupled to provide the reference output signal.

24. A method of converting an input voltage to an output voltage in a power supply by switching an inductor current according to a switching transistor drive signal, comprising:

controlling the switching transistor drive signal in response to a feedback signal;

generating a variable reference signal from a compensation signal representative of the inductor current; and adjusting the feedback signal in response to the variable reference signal.

25. The method of claim 24 wherein the variable reference signal is proportional to a square of the compensation signal.

26. The method of claim 24 wherein the step of generating further includes receiving a k-factor signal representative of the power supply.

27. The method of claim 24 wherein the step of generating further includes:

generating an output signal having a direct current (DC) level proportional to a peak value of the compensation signal; and squaring the output signal to provide the variable reference signal.

28. The method of claim 24, wherein the step of adjusting further includes adjusting the feedback signal when the variable reference signal is held constant, or adjusting the variable reference signal when the feedback signal is held constant.

29. A method of determining an output current of a power supply which converts an input voltage to an output voltage by switching an inductor current according to a switching transistor drive signal, comprising:

monitoring the inductor current to provide a compensation signal;

providing a product of the compensation signal by itself to provide a squared compensation signal;

multiplying the squared compensation signal by a k-factor signal to provide a power signal representative of output power of the power supply.

30. The method of claim 29, wherein the compensation signal is a current reference signal representative of the inductor current.

* * * * *